United States Patent [19]
Kim

[11] Patent Number: 6,007,112
[45] Date of Patent: Dec. 28, 1999

[54] PIPE COUPLING APPARATUS FOR USE IN AIR CONDITIONERS

[75] Inventor: Jae-Soon Kim, Suwon, Rep. of Korea

[73] Assignee: Samsung Electronics Co., Ltd., Suwon, Rep. of Korea

[21] Appl. No.: 08/710,852

[22] Filed: Sep. 23, 1996

[30] Foreign Application Priority Data

Sep. 23, 1995 [KR] Rep. of Korea ...................... 95-25877

[51] Int. Cl.⁶ .................................................... F16L 25/00
[52] U.S. Cl. ........................................ 285/334.5; 285/386
[58] Field of Search .................................. 285/334.5, 386

[56] References Cited

U.S. PATENT DOCUMENTS

| | | | |
|---|---|---|---|
| 771,682 | 10/1904 | Sussman | 285/334.5 X |
| 954,177 | 4/1910 | Fleming | 285/334.5 X |
| 1,838,180 | 12/1931 | Hitchcock | 285/334.5 X |
| 2,290,890 | 7/1942 | Parker | 285/334.5 |

FOREIGN PATENT DOCUMENTS

| | | | |
|---|---|---|---|
| 400859 | 4/1945 | Italy | 285/334.5 |

*Primary Examiner*—Dave W. Arola
*Attorney, Agent, or Firm*—Burns, Doane, Swecker & Mathis, L.L.P.

[57] ABSTRACT

A device for coupling together a copper pipe and a bolt pipe in an air conditioner. The copper pipe has first and second outwardly flared parts, while the bolt pipe has first and second inwardly inclined end surfaces. The end surfaces are brought into contact with the first and second flared parts, respectively, when the copper pipe is to be coupled to the bolt pipe. A nut is fitted over the copper pipe and is threadedly connected to the bolt pipe. The nut has first and second inclined shoulders on its inner surface which are brought into contact with the first and second flared parts, respectively, to push the flared parts against respective ones of the inclined end surfaces.

2 Claims, 2 Drawing Sheets

PIPE COUPLING APPARATUS FOR USE IN AIR CONDITIONERS

BACKGROUND OF THE INVENTION

1. Field of the Invention

The present invention relates in general to a device for interconnecting copper and bolt pipes, of an air conditioner.

2. Description of the Prior Art

As shown in FIG. 1, a typical device for coupling the copper and bolt pipes of an air conditioner includes a bolt pipe 10, which is coupled to the outdoor unit (not shown) of the air conditioner and is provided with an outer-threaded part 12, and through which the fluid refrigerant flows. The coupling device also includes a copper pipe 20 with a flared part 21. The copper pipe 20 is coupled to the indoor unit (not shown) of the air conditioner and supplies the fluid refrigerant from the outdoor unit to the indoor unit. The above coupling device further includes a nut 30, which couples the copper pipe 20 to the bolt pipe 10 through a flared-type pipe joint. In the above flared-type pipe joint, one end of the nut 30 is tightly fitted over the flared part 21 of the copper pipe 20 while compressing the flared part 21 onto the end of the bolt pipe 10, thus preventing leakage of the fluid refrigerant from the coupled pipes 10 and 20. The other end of the nut 30 is screwed onto the outer-threaded part 12 of the bolt pipe 10.

As shown in FIGS. 1 and 2, the end surface of the bolt pipe 10 is inclined in order to form an inclined surface 11, which is brought into close contact with the flared part 21 of the copper pipe 20. The cylindrical end portion of the bolt pipe 10, which is spaced apart from the inclined surface 11, is externally threaded in order to form the outer-threaded part 12. The outer-threaded part 12 of the bolt pipe 10 is brought into engagement with the inner-threaded part 33 of the nut 30.

As shown in FIG. 1, the flared part 21 of the copper pipe 20, which comes into close contact with the inclined end surface 11 of the bolt pipe 10, is formed by bulging one end of the copper pipe 20 so that the flared part 21 is bent thereby forming the inclined surface corresponding to the inclined end surface 11 of the bolt pipe 10.

Meanwhile, the center of the nut 30 is axially bored in order to form an axial opening 31, through which the copper pipe 20 is tightly fitted into the nut 30 as shown in FIGS. 1 and 2. The upper section of the inner surface of the opening 31 is inclined in order to form an inclined shoulder 32, which is brought into contact with the outer surface of the flared part 21 of the copper pipe 20.

However, the above coupling device has the following problems. That is, the flared part 21 of the copper pipe 20 is formed by bulging the end of the pipe 20 so that the flared part 21 is bent. In addition, both the inclined end surface 11 of the bolt pipe 10 and the inclined shoulder 32 of the nut 30, which are brought into contact with the inner and outer surfaces of the flared part 21 respectively, are inclined in the same manner as the flared part 21. In this regard, the bent portion of the flared part 21 of the copper pipe 20 is hardened during the bulging process forming the flared part 21. Therefore, when the nut 30 has been tightened in order to couple the copper pipe 20 to the bolt pipe 10 for a lengthy period of time and is loosened in order to separate the copper pipe 20 from the bolt pipe 10, the bent portion of the hardened flared part 21 may be easily cracked or cut so that the copper pipe 20 must be replaced by a new one. Another problem of the above coupling device resides in that the bolt pipe 10 may be easily moved relative to the copper pipe 20 or be damaged thereby causing leakage of the fluid refrigerant from the junction around the flared part 21.

SUMMARY OF THE INVENTION

It is, therefore, an object of the present invention to provide a structurally-improved device for coupling the copper and bolt pipes together in an air conditioner in which the above problems can be overcome and which not only prevents the cracking or cutting of the flared part of the copper part due to the tightening force of the nut, but also prevents displacement or damage of the flared part due to the relative movement between the coupled pipes thus preventing leakage of the fluid refrigerant from the junction around the flared part.

In order to accomplish the above object, the pipe coupling device for air conditioners in accordance with the preferred embodiment of the present invention comprises a copper pipe having first and second flared parts, a bolt pipe coupled to the copper pipe and having first and second inclined end surfaces so that the end surfaces are brought into contact with the first and second flared parts of the copper pipe, respectively, when the copper pipe is coupled to the bolt pipe, and a nut fitted over the copper pipe and tightened to the bolt pipe thus coupling the copper pipe to the bolt pipe, the nut being provided with first and second inclined shoulders on its inner surface, the inclined shoulders being brought into contact with the first and second flared parts of the copper pipe, respectively.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF A PREFERRED EMBODIMENT

Figure 1:
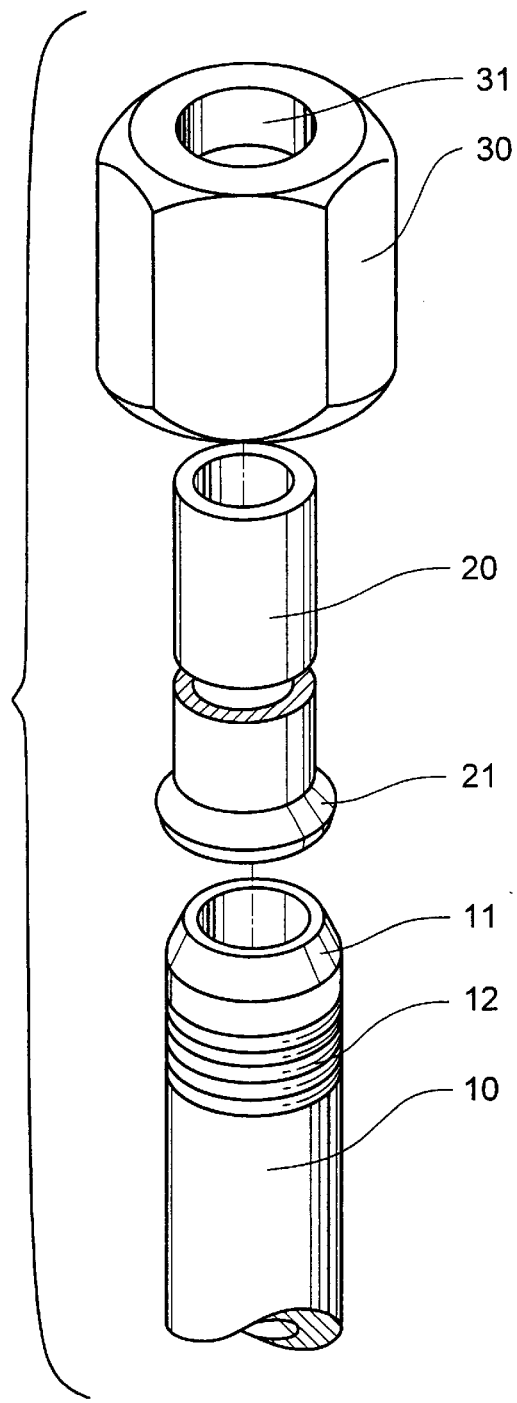
FIG. 1 is an exploded perspective view of a prior art device for coupling the copper and bolt pipes together in an air conditioner.
Figure 3:
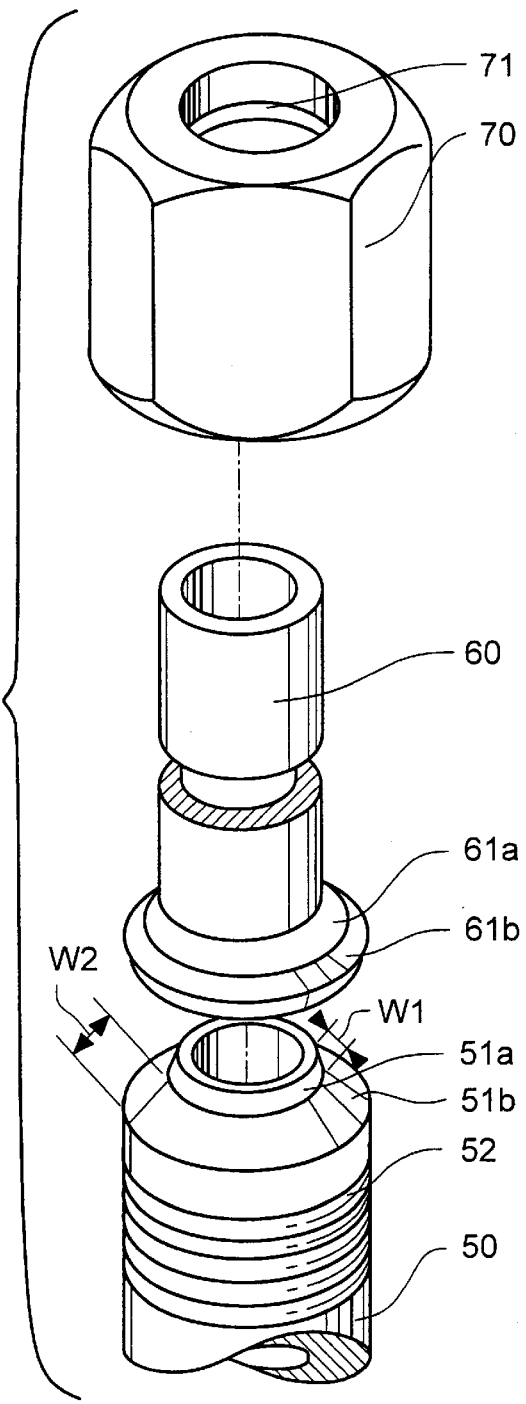
FIG. 3 is an exploded perspective view of a device for coupling copper and bolt pipes together in an air conditioner in accordance with the preferred embodiment of the present invention.
Figure 2:
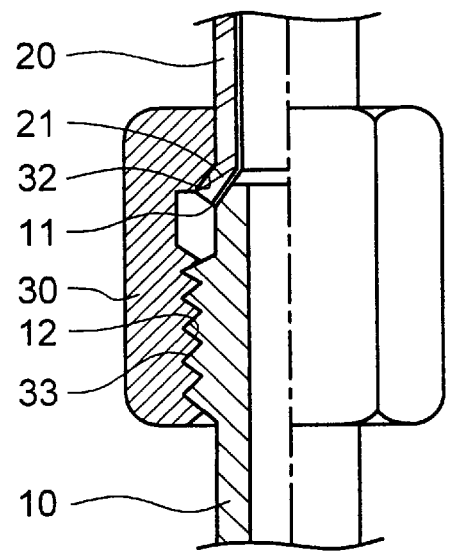
FIG. 2 is a sectional view of the prior art pipe coupling device of FIG. 1 when the copper pipe is coupled to the bolt pipe by the nut.
Figure 4:
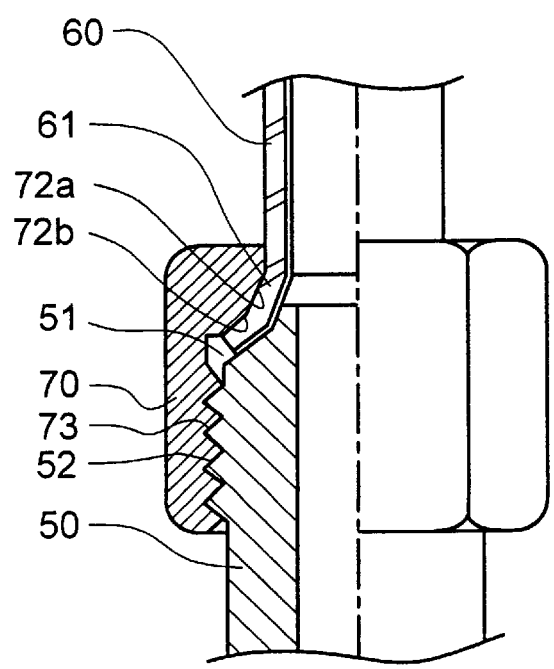
FIG. 4 is a sectional view of the pipe coupling device of FIG. 3 when the copper pipe is coupled to the bolt pipe by the nut.

FIGS. 3 and 4 show the device for coupling the copper and bolt pipes of an air conditioner in accordance with the preferred embodiment of the present invention. As shown in FIGS. 3 and 4, the pipe coupling device of this invention includes a bolt pipe 50, which is coupled to the outdoor unit (not shown) of the air conditioner and is provided with an outer-threaded part 52, and through which the fluid refrigerant flows. The coupling device also includes a copper pipe 60 with first and second flared parts 61a and 61b. The copper pipe 60 is coupled to the indoor unit (not shown) of the air conditioner and supplies the fluid refrigerant from the outdoor unit to the indoor unit. The above coupling device further includes a nut 70, which couples the copper pipe 60 to the bolt pipe 50 through a flared-type pipe joint. In the above flared-type pipe joint, one end of the nut 70 is tightly fitted over the flared parts 61a and 61b of the copper pipe 60 while compressing the flared parts 61a and 61b onto the end of the bolt pipe 50, thus preventing leakage of the fluid refrigerant from the coupled pipes 50 and 60. The other end of the nut 70 is screwed onto the outer-threaded part 52 of the bolt pipe 50.

The end surface of the bolt pipe 50 is inclined, twice in order to form two inclined surfaces, that is, first and second inclined surfaces 51a and 51b, which are brought into close contact with respective ones of the flared parts 61a and 61b of the copper pipe 60. The cylindrical end portion of the bolt pipe 50, which is spaced apart from the second inclined surface 51b, is externally threaded in order to form the outer-threaded part 52. The outer-threaded part 52 of the bolt pipe 50 is brought into engagement with the inner-threaded part 73 of the nut 70 as shown in FIG. 4. In the above construction, it is preferable to cause the width W1 and inclination of the first inclined end surface 51a to be narrower and more steep than those of the second inclined surfaces 51b, respectively. Of course, it should be understood that the flared parts of the copper pipe 60 and the inclined end surfaces of the bolt pipe 50 may be bent three or more times.

The frusto-conical flared parts 61a and 61b of the copper pipe 60, which come into close contact with respective ones of the inclined end surfaces 51a and 51b of the bolt pipe 50, are formed by bulging one end of the copper pipe 60 so that the flared parts 61a and 61b are bent twice thereby forming the inclined surfaces corresponding to the inclined end surfaces 51a and 51b of the bolt pipe 50.

Meanwhile, the center of the nut 70 is axially bored in order to form an axial opening 71, through which the copper pipe 60 is tightly fitted into the nut 70. As shown in FIG. 4, the upper section of the inner surface of the opening 71 is inclined twice in order to form two inclined shoulders, that is, first and second frusto-conical shoulders 72a and 72b, which are brought into contact with respective ones of the outer surfaces of the flared parts 61a and 61b of the copper pipe 20, respectively.

The operational effect of the above pipe coupling device will be described hereinbelow.

In order to couple the copper pipe 60 to the bolt pipe 50, the copper pipe 60 is primarily fitted into the opening 71 of the nut 70. Thereafter, the copper pipe 60 is coaxially aligned with the bolt pipe 50 while bringing the flared parts 61a and 61b of the copper pipe 60 into close contact with the inclined end surfaces 51a and 51b of the bolt pipe 50.

The nut 70 in the above state is, thereafter, tightened to the bolt pipe 50 by screwing the inner-threaded part 73 of the nut 70 onto the outer-threaded part 52 of the bolt pipe 50. Hence, the first and second flared parts 61a and 61b of the copper pipe 60 are brought into close contact with the first and second inclined end surfaces 51a and 51b of the bolt pipe 51 by the tightening force of the nut 70. That is, when the nut 70 is tightened to the bolt pipe 50, the first and second inclined shoulders 72a and 72b of the nut 70 are brought into surface contact with the flared parts 61a and 61b of the copper pipe 60 and in turn compress the flared parts 61a and 61b onto the inclined end surfaces 51a and 51b of the bolt pipe 50. Since the inclined shoulders 72a and 72b, flared parts 61a and 61b and inclined end surfaces 51a and 51b are compressed together as described above, the junctions between them are free from gaps so that the fluid refrigerant is prevented from leakage. The first and second flared parts 61a and 61b of the copper pipe 60 are bent twice, so, the bent portions of the flared parts 61a and 61b are not cracked or cut irrespective of the tightening force of the nut 70. In addition, the first and second flared parts 61a and 61b are not loosened or damaged even when the bolt pipe 50 moves relative to the copper pipe 60.

As described above, the present invention provides a device for coupling the copper and bolt pipes together in air conditioners. In the coupling device of this invention, the copper pipe has first and second flared parts, while the bolt pipe, which is coupled to the copper pipe, has first and second inclined end surfaces. The end surfaces of the bolt pipe are brought into contact with the first and second flared parts of the copper pipe, respectively, when the copper pipe is coupled to the bolt pipe. Meanwhile, the nut, which is fitted over the copper pipe and is tightened to the bolt pipe thus coupling the copper pipe to the bolt pipe, has first and second inclined shoulders on its inner surface. The inclined shoulders are brought into contact with the first and second flared parts of the copper pipe, respectively. The above coupling device thus not only prevents cracking or cutting of the flared part of the copper part due to the tightening force of the nut but, it also prevents displacement or damage of the flared part due to the relative movement between the coupled pipes thus preventing leakage of the fluid refrigerant from the junction around the flared part.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pipe conduit assembly for use in an air conditioner, comprising a copper pipe having an end portion defined by first and second axially successive outwardly flared substantially frusto-conical portions which are flared outwardly at first and second respective oblique angles relative to an axis of the copper pipe, the first angle being smaller than the second angle; and a bolt pipe having an end engageable with both of the flared portions of the copper pipe, the end of the bolt pipe including first and second axially successive inwardly inclined substantially frusto-conical portions engaging the first and second flared portions, respectively, and extending at the first and second angles, respectively, the first inclined portion of the end of the bolt pipe being of smaller width than the second inclined portion thereof; and a nut threadedly connected to the bolt pipe for bringing the two flared portions into tight contact with the end of the bolt pipe, the nut including first and second axially successive inclined substantially frusto-conical shoulders contacting the first and second flared portions respectively, and oriented at substantially the first and second oblique angles, respectively.

2. The assembly according to claim 1, wherein the nut includes an internally threaded portion threadedly engageable with an external thread on the bolt pipe.

* * * * *